United States Patent
Ha

(10) Patent No.: US 12,280,490 B2
(45) Date of Patent: Apr. 22, 2025

(54) METHOD, SYSTEM, AND NON-TRANSITORY COMPUTER-READABLE RECORDING MEDIUM FOR CONTROLLING A SERVING ROBOT

(71) Applicant: Bear Robotics, Inc., Redwood City, CA (US)

(72) Inventor: John Jungwoo Ha, Frisco, TX (US)

(73) Assignee: Bear Robotics, Inc., Redwood City, CA (US)

( * ) Notice: Subject to any disclaimer, the term of this patent is extended or adjusted under 35 U.S.C. 154(b) by 638 days.

(21) Appl. No.: 17/391,242

(22) Filed: Aug. 2, 2021

(65) Prior Publication Data

US 2023/0032760 A1    Feb. 2, 2023

(51) Int. Cl.
*B25J 13/08* (2006.01)
*G05B 19/4155* (2006.01)
*G10L 15/22* (2006.01)

(52) U.S. Cl.
CPC .......... *B25J 13/08* (2013.01); *G05B 19/4155* (2013.01); *G10L 15/22* (2013.01); *G05B 2219/45084* (2013.01)

(58) Field of Classification Search
CPC ...... B25J 13/08; B25J 11/008; B25J 11/0005; B25J 5/007; B25J 9/1697; B25J 11/0045; G05B 19/4155; G05B 2219/45084; G10L 15/22; G10L 13/00
See application file for complete search history.

(56) References Cited

U.S. PATENT DOCUMENTS

| | | | | |
|---|---|---|---|---|
| 10,726,836 | B2 * | 7/2020 | Baik | G10L 25/57 |
| 2016/0379107 | A1 * | 12/2016 | Li | B25J 11/0005 |
| | | | | 706/11 |
| 2020/0130194 | A1 | 4/2020 | Yamamoto | |
| 2020/0320994 | A1 * | 10/2020 | Totsuka | G10L 17/22 |
| 2020/0411015 | A1 * | 12/2020 | Kim | G10L 15/16 |
| 2022/0176565 | A1 * | 6/2022 | Munich | B25J 9/1697 |

FOREIGN PATENT DOCUMENTS

| | | | | |
|---|---|---|---|---|
| CN | 106737736 A | * | 5/2017 | |
| CN | 107358950 A | * | 11/2017 | |
| CN | 108582116 A | * | 9/2018 | |
| CN | 109979430 A | * | 7/2019 | G10L 13/00 |
| JP | 2001188553 A |   | 7/2001 | |

(Continued)

OTHER PUBLICATIONS

WO-2019156280-A1 translation (Year: 2019).*

(Continued)

*Primary Examiner* — Kyle T Johnson
(74) *Attorney, Agent, or Firm* — Dinsmore & Shohl LLP; Yongsok Choi, Esq.

(57) ABSTRACT

A method for controlling a serving robot is provided. The method includes the steps of: generating at least one character on the basis of at least one property related to a voice, and determining a character to be applied to a serving robot from among the at least one generated character; and generating at least one piece of visual information corresponding to the determined character, and determining a piece of visual information to be applied to the serving robot from among the at least one generated piece of visual information.

11 Claims, 4 Drawing Sheets

(56) References Cited

FOREIGN PATENT DOCUMENTS

| | | | |
|---|---|---|---|
| JP | 2016193466 A | 11/2016 | |
| JP | 2020067799 A | 4/2020 | |
| JP | 2021074492 A | 5/2021 | |
| KR | 20090001172 A * | 1/2009 | |
| KR | 101083700 B1 | 11/2011 | |
| KR | 101920620 B1 | 11/2018 | |
| KR | 1020210001529 A | 1/2021 | |
| WO | WO-2019156280 A1 * | 8/2019 | ............ B25J 11/001 |
| WO | 2020045658 A1 | 3/2020 | |

OTHER PUBLICATIONS

KR-20090001172-A translation (Year: 2009).*
CN-107358950-A translation (Year: 2017).*
CN-108582116-A translation (Year: 2018).*
CN-109979430-A translation (Year: 2019).*
CN-106737736-A translation (Year: 2017).*
Creating Robotic Characters for Long Term Interation (Year: 2012).*

* cited by examiner

METHOD, SYSTEM, AND NON-TRANSITORY COMPUTER-READABLE RECORDING MEDIUM FOR CONTROLLING A SERVING ROBOT

FIELD OF THE INVENTION

The present invention relates to a method, system, and non-transitory computer-readable recording medium for controlling a serving robot.

BACKGROUND

Serving means providing objects including drinks or food to customers in a place such as a restaurant. In recent years, robots and the like have been developed and used for serving in place of, or rendering assistance to, waiters or waitresses. Such a robot usually functions to take food orders or carry out serving according to the orders, and may perform autonomous navigation using table position information or the like. The robot may comprise a transport means (including sensors for avoiding obstacles), a display means for menu output or order input, and the like. Further, the robot may include a means for placing or carrying food or food containers.

As an example of related conventional techniques, Korean Registered Patent Publication No. 10-1083700 discloses a restaurant serving robot system for taking orders in a restaurant and transporting a tray where ordered food is placed, the system comprising: an upper part including a pair of articulated robot arms which are synchronously driven, and a tray holding part rotatably coupled to a lower end of the articulated robot arms and configured to fix the tray; a lower part at a bottom part of which a robot moving part including a main wheel and one or more auxiliary wheels is provided; a middle part fixed to the lower part and rotatably connected to the upper part; and a control part configured to control the operations of the pair of articulated robot arms, the tray holding part, and the robot moving part, wherein the tray holding part comprises: a hand rotatably coupled to an end of the articulated robot arms; a fixing part provided at the hand to move upward and downward; a gripper positioned at a bottom part of the tray and coupled to the fixing part; a stopper positioned at a top part of the tray and coupled to the fixing part to face the gripper; a switch pressed by the fixing part which moves upward when the stopper is pressed by the tray at the same time the end of the articulated robot arms is driven downward; a spring contracted when the fixing part moves upward; and a gripper angle detection unit configured to detect an angle of the gripper.

However, when a serving robot provides sound information to a customer while carrying out serving (e.g., when the serving robot arrives at a table of a customer who has ordered food and notifies the customer to pick up the food placed on a support), the techniques introduced so far as well as the above-described conventional technique are merely able to provide the sound information using only a uniformly set voice, and fail to suggest causing each serving robot to provide the sound information using a unique voice.

SUMMARY OF THE INVENTION

One object of the present invention is to solve all the above-described problems in the prior art.

Another object of the invention is to, when a serving robot provides sound information to a customer while carrying out serving, cause each serving robot to provide the sound information using a unique voice, thereby providing a new customer experience in which the serving carried out by the serving robot is perceived as if the serving is carried out by a human waiter or waitress.

The representative configurations of the invention to achieve the above objects are described below.

According to one aspect of the invention, there is provided a method for controlling a serving robot, the method comprising the steps of: generating at least one character on the basis of at least one property related to a voice, and determining a character to be applied to a serving robot from among the at least one generated character; and generating at least one piece of visual information corresponding to the determined character, and determining a piece of visual information to be applied to the serving robot from among the at least one generated piece of visual information.

According to another aspect of the invention, there is provided a system for controlling a serving robot, the system comprising: a character determination unit configured to generate at least one character on the basis of at least one property related to a voice, and determine a character to be applied to a serving robot from among the at least one generated character; and a visual information determination unit configured to generate at least one piece of visual information corresponding to the determined character, and determine a piece of visual information to be applied to the serving robot from among the at least one generated piece of visual information.

In addition, there are further provided other methods and systems to implement the invention, as well as non-transitory computer-readable recording media having stored thereon computer programs for executing the methods.

According to the invention, it is possible to, when a serving robot provides sound information to a customer while carrying out serving, cause each serving robot to provide the sound information using a unique voice, thereby providing a new customer experience in which the serving carried out by the serving robot is perceived as if the serving is carried out by a human waiter or waitress.

DETAILED DESCRIPTION OF THE INVENTION

Figure 1:
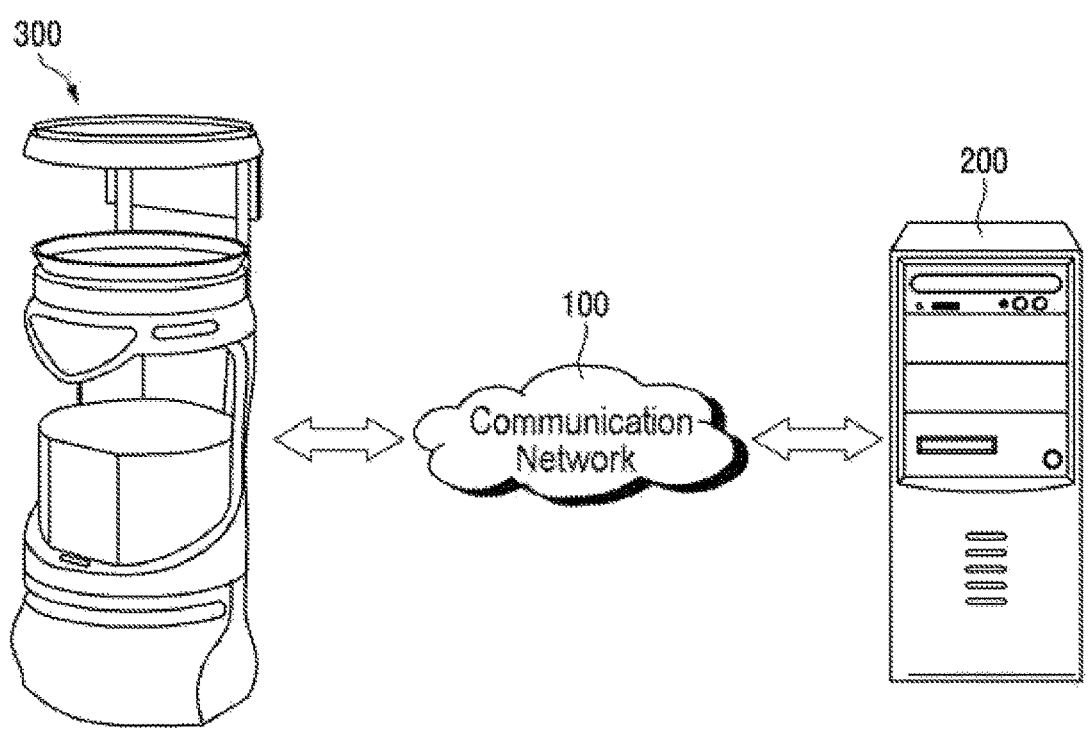
FIG. 1 schematically shows the configuration of an entire system for controlling a serving robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a serving robot according to one embodiment of the invention.

As shown in FIG. 1, the entire system according to one embodiment of the invention may comprise a communication network 100, a robot control system 200, and a serving robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the robot control system 200 according to one embodiment of the invention may function to: generate at least one character on the basis of at least one property related to a voice, and determine a character to be applied to the serving robot 300 from among the at least one generated character; and generate at least one piece of visual information corresponding to the determined character, and determine a piece of visual information to be applied to the serving robot 300 from among the at least one generated piece of visual information.

The configuration and functions of the robot control system 200 according to the invention will be discussed in more detail below.

Next, the serving robot 300 according to one embodiment of the invention is a device capable of communicating with the robot control system 200 via the communication network 100 and performing predetermined functions or assigned tasks (e.g., serving food, retrieving containers, etc.) autonomously without any operation of a user (e.g., an employee or a customer), and may include a support configured to support at least one object. The serving robot 300 according to one embodiment of the invention may include at least one of a module (e.g., a grab or a robotic arm module) for loading and unloading an object (e.g., a food tray), an imaging module (e.g., a visible light camera or an infrared camera) for acquiring images of surroundings, a scanner module (e.g., a LIDAR sensor) for acquiring information on obstacles, a sound acquisition module (e.g., a microphone) for acquiring sounds of surroundings, an illuminance acquisition module (e.g., an illuminance sensor) for sensing brightness of surroundings, a speaker module for providing sound information, a display module (e.g., LCD) for providing visual information such as text information, a light emitting module (e.g., LED) for providing visual information such as color information, and a drive module (e.g., a motor) for moving the serving robot 300.

For example, the serving robot 300 may have characteristics or functions similar to those of at least one of a guide robot, a transport robot, a cleaning robot, a medical robot, an entertainment robot, a pet robot, and an unmanned flying robot. Meanwhile, supporting of an object herein should be interpreted as encompassing supporting of a container for containing an object such as food, a means where the container may be placed (e.g., a tray), or the like.

Meanwhile, according to one embodiment of the invention, the serving robot 300 may include an application (not shown) for controlling the serving robot 300 according to the invention. The application may be downloaded from the robot control system 200 or an external application distribution server (not shown). According to one embodiment of the invention, the characteristics of the application may be generally similar to those of a character determination unit 210, a visual information determination unit 220, a communication unit 230, and a control unit 240 of the robot control system 200 to be described below. Here, at least a part of the application may be replaced with a hardware device or a firmware device that may perform a substantially equal or equivalent function, as necessary.

Figure 2:
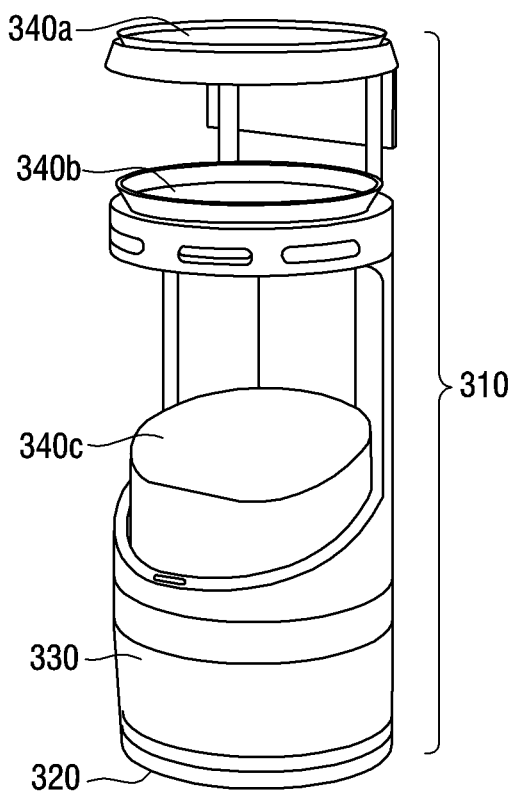
FIG. 2 illustratively shows the structure of a serving robot according to one embodiment of the invention.
Figure 3:
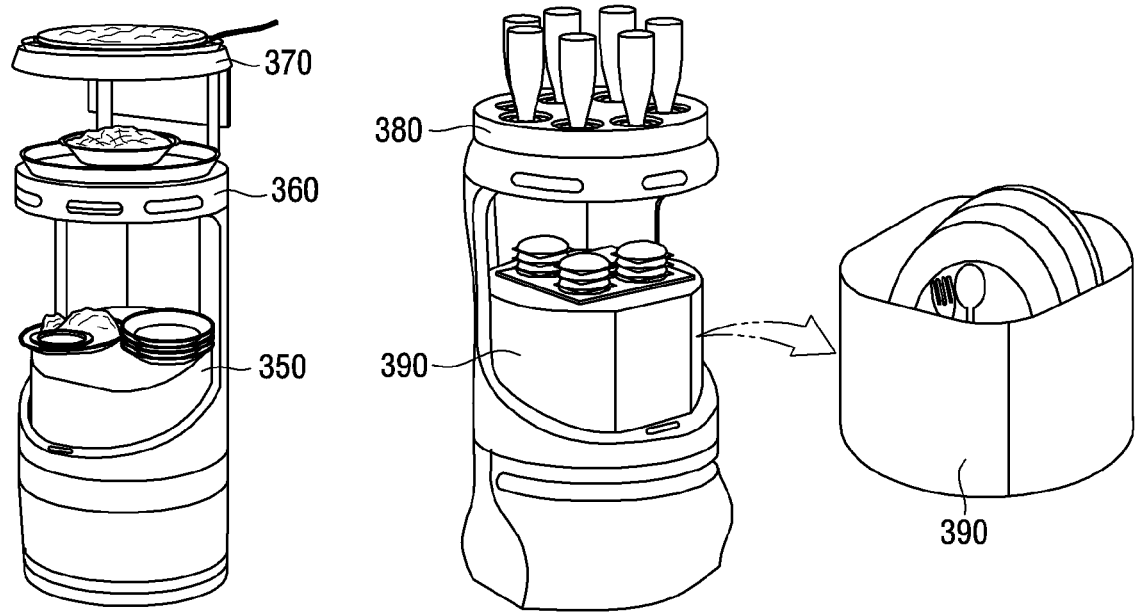
FIG. 3 illustratively shows the structure of a serving robot according to one embodiment of the invention.

FIGS. 2 and 3 illustratively show the structure of the serving robot 300 according to one embodiment of the invention.

Referring to FIG. 2, the serving robot 300 may comprise a main body 310, a drive unit 320, and a processor 330.

First, the main body 310 according to one embodiment of the invention may be coupled to supports 340a, 340b, and 340c configured to support at least one object. According to one embodiment of the invention, the supports 340a, 340b, and 340c may be removably coupled for cleaning, replacement, or the like. Further, each of the supports 340a, 340b, and 340c may include a weight sensor (not shown) for sensing a weight supported by each of the supports 340a, 340b, and 340c. According to one embodiment of the invention, the weight sensor may be implemented using one or more strain gauges (e.g., three strain gauges, four strain gauges, or the like). In addition, according to one embodiment of the invention, the weight sensor may be coupled to the processor 330.

Further, the main body 310 according to one embodiment of the invention may include a photographing module (not shown) configured to face a spatial region above each of the supports 340a, 340b, and 340c, in place of or in addition to the weight sensor. Meanwhile, according to one embodiment of the invention, the photographing modules configured to face the spatial regions above the respective supports 340a, 340b, and 340c are not necessarily included in the main body 310, and at least some of the photographing modules may be installed on a structure in a serving place.

Meanwhile, the main body 310 according to one embodiment of the invention may include at least one loading space for loading an object. Further, according to one embodiment of the invention, the at least one loading space may include the supports 340a, 340b, and 340c. The object according to one embodiment of the invention may refer to all material objects that can be moved by the serving robot 300, and may encompass things, animals, and the like. For example, the object according to one embodiment of the invention may include a serving object such as food and a bussing object such as a container containing the food.

Referring to FIG. 3, the serving robot 300 according to one embodiment of the invention may include a first space 350 and a second space 360 for providing a serving object (i.e., serving) and collecting a bussing object (i.e., bussing). Further, the serving robot 300 may further include a third space 370 that is an expansion space provided via a removable pillar, and more loading spaces may be provided by adding more expansion spaces as needed. Further, the serving robot 300 may further include a tray 380 dedicated for the serving object or the bussing object. For example, the tray 380 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 350 of the serving robot 300 may include a fourth space 390 that may be taken out through a lateral side of the serving robot 300. The fourth space 390 according to one embodiment of the invention may have a shape similar to a basket, such that an empty space is formed therein; a lateral side thereof is closed; a top side thereof is open; and a bottom side thereof is closed. However, the loading spaces of the serving robot 300 according to the invention are not necessarily limited to the above description, and may be diversely implemented as other types of loading spaces as long as the objects of the invention may be achieved.

Next, referring to FIG. 2 again, the drive unit 320 according to one embodiment of the invention may comprise a module for moving the main body 310 to other locations. For example, the drive unit 320 may include a module related to electrically, mechanically, or hydraulically driven wheels, propellers, or the like as the module for moving the main body 310 to other locations.

Next, the processor 330 according to one embodiment of the invention may be electrically connected to the drive unit 320 to perform a function of controlling the drive unit 320 (and may include a communication module for communicating with an external system). For example, the processor 330 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 330 may perform the functions of at least one of the character determination unit 210 and the visual information determination unit 220 of the robot control system 200 according to the invention (e.g., the corresponding functions may be modularized and included in the processor 330), and may function to control the drive unit 320 through communication with an external system (not shown) that performs the functions of at least one of the character determination unit 210 and the visual information determination unit 220.

Specifically, the processor 330 may function to: generate at least one character on the basis of at least one property related to a voice, and determine a character to be applied to the serving robot 300 from among the at least one generated character; and generate at least one piece of visual information corresponding to the determined character, and determine a piece of visual information to be applied to the serving robot 300 from among the at least one generated piece of visual information.

Configuration of the Robot Control System

Hereinafter, the internal configuration of the robot control system 200 crucial for implementing the invention and the functions of the respective components thereof will be discussed.

Figure 4:
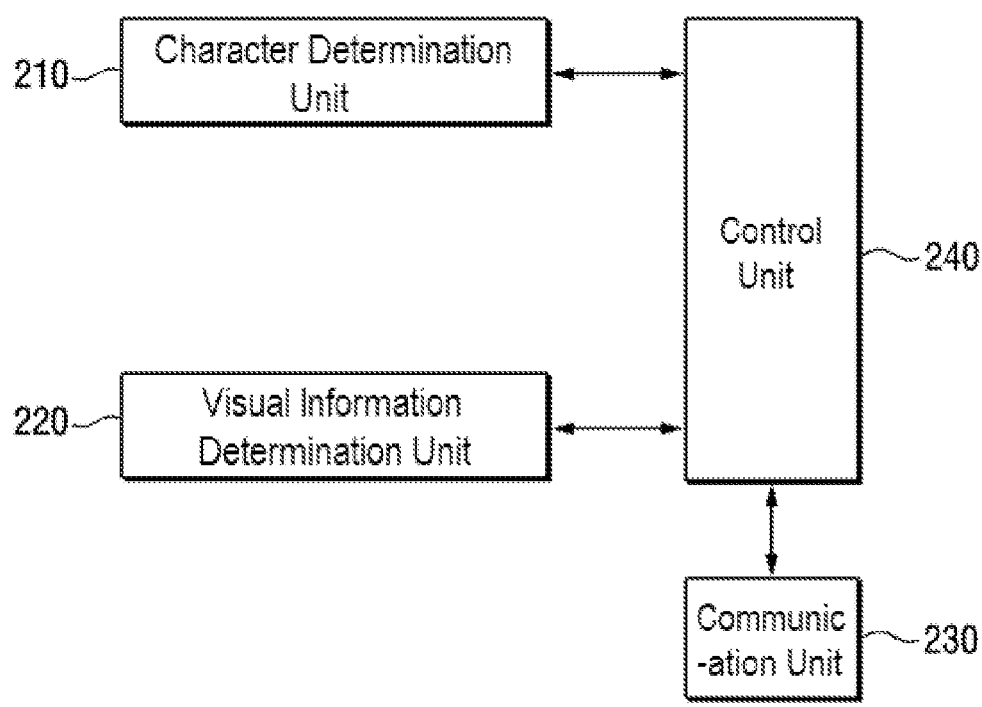
FIG. 4 specifically shows the internal configuration of a robot control system according to one embodiment of the invention.

FIG. 4 specifically shows the internal configuration of the robot control system 200 according to one embodiment of the invention.

As shown in FIG. 4, the robot control system 200 according to one embodiment of the invention may comprise a character determination unit 210, a visual information determination unit 220, a communication unit 230, and a control unit 240. According to one embodiment of the invention, at least some of the character determination unit 210, the visual information determination unit 220, the communication unit 230, and the control unit 240 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

Meanwhile, the above description is illustrative although the robot control system 200 has been described as above, and it will be apparent to those skilled in the art that at least a part of the components or functions of the robot control system 200 may be implemented or included in the serving robot 300 or an external system (not shown), as necessary. Further, in some cases, all of the functions and components of the robot control system 200 may be implemented or included in the serving robot 300.

First, the character determination unit 210 according to one embodiment of the invention may function to generate at least one character on the basis of at least one property related to a voice, and determine a character to be applied to the serving robot 300 from among the at least one generated character.

Specifically, the character determination unit 210 according to one embodiment of the invention may generate at least one character each having a different voice on the basis of at least one property related to a voice. Here, the at least one property related to the voice may include at least one of a pitch, loudness, and timbre of the voice.

More specifically, the character determination unit 210 according to one embodiment of the invention may generate at least one character on the basis of a user's setting values for at least one property related to a voice. For example, the user may input setting values for customizing a character's voice into the character determination unit 210, and the character determination unit 210 may combine the setting values inputted from the user to generate a character having a specific voice. The character determination unit 210 according to one embodiment of the invention may store at least one character generated on the basis of the user's setting values for the at least one property to related to the voice in a database (or cloud).

Meanwhile, the character determination unit 210 according to one embodiment of the invention may recommend a setting value to the user while the user inputs the setting values for customizing the character's voice into the character determination unit 210. For example, the character determination unit 210 according to one embodiment of the invention may extract at least one property related to a voice from sound information acquired from a subject (e.g., a customer) to whom the serving robot 300 provides a service, and may recommend the at least one extracted property related to the voice to the user as a setting value. However, the manner of recommending the setting value to the user by the character determination unit 210 according to one embodiment of the invention is not necessarily limited to the above description, and may be diversely changed as long as the objects of the invention may be achieved.

Next, the character determination unit 210 according to one embodiment of the invention may determine a character to be applied to the serving robot 300 from among the at least one character generated on the basis of the at least one property related to the voice.

Specifically, the character determination unit 210 according to one embodiment of the invention may determine a character to be applied to the serving robot 300 from among the at least one character stored in the database or the like. For example, the character determination unit 210 according to one embodiment of the invention may determine a character that the user selects from among the at least one character stored in the database or the like as the character to be applied to the serving robot 300. As another example, the character determination unit 210 according to one embodiment of the invention may randomly determine the character to be applied to the serving robot 300 from among the at least one character stored in the database or the like. However, the manner of determining the character to be applied to the serving robot 300 by the character determination unit 210 according to one embodiment of the invention is not necessarily limited to the above description, and may be diversely changed as long as the objects of the invention may be achieved.

Meanwhile, when the serving robot 300 is composed of a plurality of serving robots 300, the character determination unit 210 according to one embodiment of the invention may determine characters to be applied to the plurality of serving robots 300 using a manner different from those illustrated above.

For example, when the serving robot 300 is composed of a plurality of serving robots 300, the character determination unit 210 according to one embodiment of the invention may differently determine characters to be respectively applied to the plurality of serving robots 300. That is, according to one embodiment of the invention, the characters to be respectively applied to the plurality of serving robots 300 may not be duplicate.

As another example, when the serving robot 300 is composed of a plurality of serving robots 300, the character determination unit 210 according to one embodiment of the invention may group the plurality of serving robots 300 with respect to a role of each of the plurality of serving robots 300 (e.g., the plurality of serving robots 300 may be grouped into a group for serving and a group for bussing), and may differently determine characters to be applied to the plurality of serving robots 300 for each group. That is, according to one embodiment of the invention, the characters applied to the respective groups may be different from each other, and the characters applied to the serving robots 300 belonging to the same group may be the same.

However, the manner of determining the characters to be applied to the plurality of serving robots 300 by the character determination unit 210 according to one embodiment of the invention is not necessarily limited to the above description, and may be diversely changed as long as the objects of the invention may be achieved.

Next, the character determination unit 210 according to one embodiment of the invention may dynamically change at least one property related to a voice of the character applied to the serving robot 300, on the basis of information on surroundings acquired during travel of the serving robot 300. Here, the information on the surroundings may include at least one of information on a serving place (e.g., a restaurant) where the serving robot 300 provides a service (e.g., information on illumination of the serving place) and information on a subject (e.g., a customer) to whom the serving robot 300 provides a service (e.g., information on attire of the subject to whom the service is provided).

For example, according to one embodiment of the invention, when illumination of a serving place where the serving robot 300 provides a service is set to be dark, the atmosphere of the serving place is likely to be generally quiet. Accordingly, the serving robot 300 according to one embodiment of the invention may acquire information on the illumination of the serving place while traveling the serving place, and the character determination unit 210 according to one embodiment of the invention may decrease sound volume of the character applied to the serving robot 300 on the basis of the information on the illumination of the serving place acquired by the serving robot 300.

As another example, according to one embodiment of the invention, when a subject to whom the serving robot 300 provides a service wears a dress or a suit, the subject is likely to be attending a formal event. Accordingly, the serving robot 300 according to one embodiment of the invention may acquire information on attire of the subject while traveling the serving place, and the character determination unit 210 according to one embodiment of the invention may change a tone of the character applied to the serving robot 300 to a formal one (e.g., a soft and profound tone) on the basis of the information on the attire of the subject acquired by the serving robot 300.

However, the manner (or criterion) of dynamically changing the at least one property related to the voice of the character applied to the serving robot 300 by the character determination unit 210 according to one embodiment of the invention is not necessarily limited to the above description, and may be diversely changed as long as the objects of the invention may be achieved.

According to one embodiment of the invention, a character may be applied to the serving robot 300 as described above so that the serving robot 300 has a unique voice according to the applied character, thereby rendering the serving robot 300 as capable as a human waiter or waitress in terms of customer service capabilities.

Next, the visual information determination unit 220 may function to generate at least one piece of visual information corresponding to the character determined to be applied to the serving robot 300, and determine a piece of visual information to be applied to the serving robot 300 from among the at least one generated piece of visual information.

Specifically, in order to visualize the character determined to be applied to the serving robot 300, the visual information determination unit 220 according to one embodiment of the invention may generate at least one piece of visual information corresponding to the character. Here, the at least one piece of visual information corresponding to the character to be applied to the serving robot 300 may include information on at least one of a name, shape, and color of the character.

More specifically, the visual information determination unit 220 according to one embodiment of the invention may generate at least one piece of visual information corresponding to the character to be applied to the serving robot 300, on the basis of a user's setting values for the at least one piece of visual information corresponding to the character. For example, on the basis of a setting value inputted by the user to set a name corresponding to the character to be applied to the serving robot 300, the visual information determination unit 220 according to one embodiment of the invention may generate information on the name of the character (e.g., Becky). As another example, on the basis of a setting value inputted by the user to set a shape corresponding to the character to be applied to the serving robot 300, the visual information determination unit 220 according to one embodiment of the invention may generate information on the shape of the character (e.g., the shape of a woman). As yet another example, on the basis of a setting value inputted by the user to set a color corresponding to the character to be applied to the serving robot 300, the visual information determination unit 220 according to one embodiment of the invention may generate information on the color of the character (e.g., green color). That is, the user may input setting values for customizing the at least one piece of visual information corresponding to the character to be applied to the serving robot 300 into the visual information determination unit 220, and the visual information determination unit 220 may generate the at least one piece of visual information corresponding to the character on the basis of the setting values inputted from the user. Meanwhile, the visual information determination unit 220 may store the at least one piece of visual information generated as above in a database (or cloud).

Meanwhile, the visual information determination unit 220 according to one embodiment of the invention may generate the at least one piece of visual information on the basis of a machine learning (or deep learning)-based learning model. Here, the learning model may be a model trained to generate, on the basis of data on a voice (or at least one property related the voice), at least one piece of visual information matching with the data on the voice. For example, the visual information determination unit 220 according to one embodiment of the invention may input data on a voice of the character to be applied to the serving robot 300 into the above learning model, thereby generating at least one piece of visual information matching with the data on the voice of the character.

However, the manner of generating the at least one piece of visual information corresponding to the character to be applied to the serving robot 300 by the visual information determination unit 220 according to one embodiment of the invention is not necessarily limited to the above description, and may be diversely changed as long as the objects of the invention may be achieved.

Next, the visual information determination unit 220 according to one embodiment of the invention may determine a piece of visual information to be provided via a specific module (e.g., a module capable of providing visual information, such as a display module (not shown) or a light emitting module (not shown)) of the serving robot 300 from among the at least one piece of visual information stored in the database or the like.

For example, the visual information determination unit 220 according to one embodiment of the invention may determine Becky, which is generated as the information on the name of the character to be applied to the serving robot 300, as the piece of visual information to be provided via the display module of the serving robot 300. As another example, the visual information determination unit 220 according to one embodiment of the invention may determine the shape of a woman, which is generated as the information on the shape of the character to be applied to the serving robot 300, as the piece of visual information to be provided via the display module of the serving robot 300. As yet another example, the visual information determination unit 220 according to one embodiment of the invention may determine green color, which is generated as the information on the color of the character to be applied to the serving robot 300, as the piece of visual information to be provided via the light emitting module of the serving robot 300.

According to one embodiment of the invention, it is possible to recognize the character applied to the serving robot 300 through the visual information determined as above, and thus particularly when the serving robot 300 is composed of a plurality of serving robots 300, the characters respectively applied to the plurality of serving robots 300 may be easily distinguished through the visual information.

Next, the communication unit 230 according to one embodiment of the invention may function to enable data transmission/reception from/to the character determination unit 210 and the visual information determination unit 220.

Lastly, the control unit 240 according to one embodiment of the invention may function to control data flow among the character determination unit 210, the visual information determination unit 220, and the communication unit 230. That is, the control unit 240 according to one embodiment of the invention may control data flow into/out of the robot control system 200 or data flow among the respective components of the robot control system 200, such that the character determination unit 210, the visual information determination unit 220, and the communication unit 230 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling one or more serving robots, the method comprising the steps of:
    generating at least one character on the basis of at least one property related to a voice, and determining a character to be applied to one or more serving robots from among the at least one generated character;
    generating at least one piece of visual information corresponding to the determined character, and determining a piece of visual information to be applied to the one or more serving robots from among the at least one generated piece of visual information, and
    controlling the one or more serving robots to autonomously operate on the basis of the generated at least one piece of visual information,
    wherein in response to determining that the one or more serving robots include a plurality of serving robots, the character to be applied to the one or more serving robots is differently determined for each of the plurality of serving robots.

2. The method of claim 1, wherein the at least one property related to the voice includes at least one of a pitch, loudness, and timbre of the voice.

3. The method of claim 1, wherein the at least one property related to the voice is dynamically changed on the basis of information on surroundings acquired during travel of the one or more serving robots.

4. The method of claim 3, wherein the information on the surroundings includes at least one of information on a place where the one or more serving robots provide a service and information on a subject to whom the one or more serving robots provide a service.

5. The method of claim 1, wherein the at least one piece of visual information corresponding to the determined character includes information on at least one of a name, shape, and color of the determined character.

6. A non-transitory computer-readable recording medium having stored thereon a computer program for executing the method of claim 1.

7. A system for controlling one or more serving robots, the system comprising:
    a character determination unit configured to generate at least one character on the basis of at least one property related to a voice, and determine a character to be applied to one or more serving robots from among the at least one generated character;
    a visual information determination unit configured to generate at least one piece of visual information corresponding to the determined character, and determine a piece of visual information to be applied to the one or more serving robots from among the at least one generated piece of visual information; and
    a processor configured to control the one or more serving robots to autonomously operate on the basis of the generated at least one piece of visual information,
    wherein in response to determining that the one or more serving robots include a plurality of serving robots, the character to be applied to the one or more serving robots is differently determined for each of the plurality of serving robots.

8. The system of claim 7, wherein the at least one property related to the voice includes at least one of a pitch, loudness, and timbre of the voice.

9. The system of claim 7, wherein the at least one property related to the voice is dynamically changed on the basis of information on surroundings acquired during travel of the one or more serving robots.

10. The system of claim 9, wherein the information on the surroundings includes at least one of information on a place where the one or more serving robots provide a service and information on a subject to whom the one or more serving robots provide a service.

11. The system of claim 7, wherein the at least one piece of visual information corresponding to the determined character includes information on at least one of a name, shape, and color of the determined character.

* * * * *